(No Model.)
W. RICHWINE.
TIRE FOR BICYCLES.
No. 459,614. Patented Sept. 15, 1891.
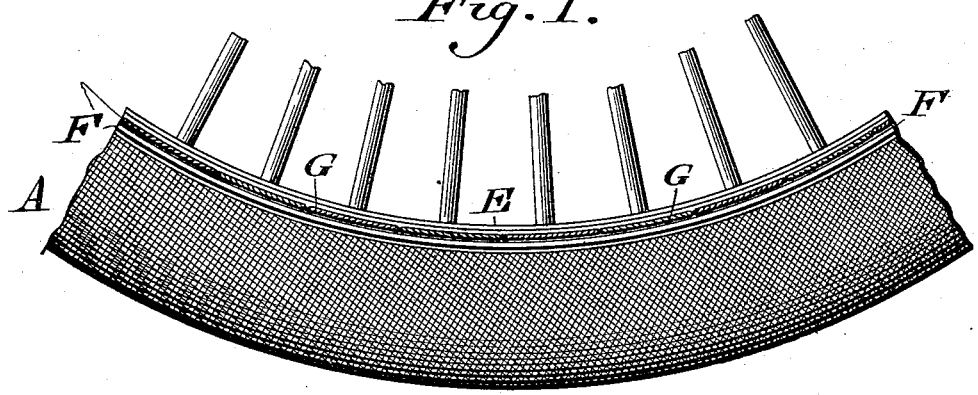
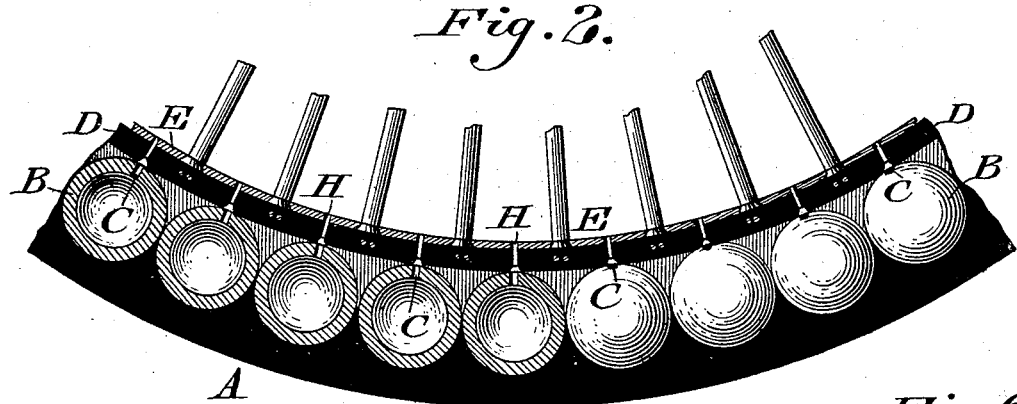
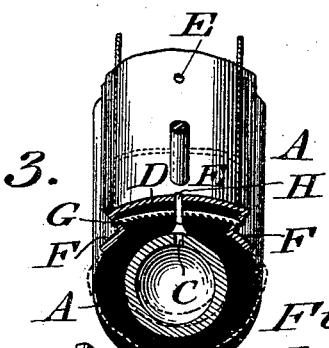
WITNESSES:
INVENTOR
William Richwine
BY
John A. Wiedersheim
ATTORNEY.

UNITED STATES PATENT OFFICE.

WILLIAM RICHWINE, OF PHILADELPHIA, PENNSYLVANIA.

TIRE FOR BICYCLES.

SPECIFICATION forming part of Letters Patent No. 459,614, dated September 15, 1891.

Application filed December 16, 1890. Serial No. 374,907. (No model.)

*To all whom it may concern:*

Be it known that I, WILLIAM RICHWINE, a citizen of the United States, residing in the city and county of Philadelphia, State of Pennsylvania, have invented a new and useful Improvement in Tires for Bicycles, &c., which improvement is fully set forth in the following specification and accompanying drawings.

My invention consists of a tire, more particularly for bicycles, &c., formed of a tube of elastic material, and air-filled or inflated bodies therein as cushions, with means for permitting the air to escape from and be returned to said bodies, whereby an easy-riding tire is produced and the same is well sustained in its peripheral direction.

It also consists of novel means of connecting the elastic tube or tire with a metallic rim, to which all the spokes are attached, as will be hereinafter fully set forth.

Figure 1 represents a side elevation of a portion of a tire embodying my invention. Fig. 2 represents a longitudinal section thereof. Fig. 3 represents a transverse section thereof. Fig. 4 represents a longitudinal section of a portion of a modification thereof. Figs. 5 and 6 represent detail views.

Similar letters of reference indicate corresponding parts in the several figures.

Referring to the drawings, A designates a tube of soft rubber or other suitable material, curved after the manner of a tire. Within the tube are hollow balls B of rubber, Figs. 2 and 3, (or in lieu thereof the segmental bodies, as in Fig. 4,) said balls having openings C for the eduction and induction of air, as will be hereinafter set forth. The inner periphery of the tube A is formed with a neck D, which is embraced by a band E, of metal, whose ends are provided with flanges F, which rest upon the portion of the tube aside of said neck D. Extending transversely through the sides of the band E and the neck D are cords or straps G, which are laced through said band and neck, thus firmly connecting the same, it being noticed that the spokes of the wheel, of which the present tire constitutes a part, are connected with the band E. In the band are openings H, which are in communication with the openings in the neck of the tube, and likewise with the openings C in the balls or bodies B. The interior of the tube, at what may be called the "outer" periphery thereof, is formed with pockets in which the balls B are seated, so that said balls retain their position, the same being most clearly shown in Fig. 2.

It will be seen that when the wheel is in operation the ball, which is coincident with the contact part of the tire with the ground, is compressed, and the air therein is forced through the opening C and the coincident opening in the neck and band and so escapes into the atmosphere, the body yielding and thus rendering the tube more elastic at the treading-point of the wheel. As soon as the ball in question has passed said point it is released from pressure and the air re-enters the balls and fills the same, thus keeping the tube or tire properly inflated. Owing to the neck D, the flanges of the band E, and the lacings or fastenings G, the tube A is firmly connected with the band, the means employed being simple, inexpensive, and noiseless in their nature. The flanges F serve to brace the portion of the tube aside of the neck thereof and to receive the thrust of the tube when weight is superimposed thereon.

In lieu of the cord or strap G, I may employ wire, either of which is inclosed in a sleeve, sheath, or bushing J, which serves to prevent cutting of the material of the adjacent portion of the tube.

Having thus described my invention, what I claim as new, and desire to secure by Letters Patent, is—

1. A tire consisting of an elastic tube with pockets therein and provided with inflatable balls fitted in said pockets, said balls and tube having coinciding openings leading to the atmosphere, said parts being combined substantially as described.

2. A tire consisting of an elastic tube with pockets therein and provided with inflatable balls fitted in said pockets, said balls having openings adapted to coincide with openings in the inner periphery of the tube, said parts being combined substantially as described.

3. In a tire, an elastic tube inclosing a series of individual inflatable bodies therein and a plate or rim on the inner periphery thereof, in combination with cords, &c., passed laterally through the inner sides of said tube and plate, substantially as described.

4. An elastic tube with a neck, a series of individual inflatable bodies in said tube, and an inner plate or rim having flanges embracing said neck, in combination with cords, lacings, &c., passed laterally through said neck and the sides of the plate, substantially as described.

5. A tire having an elastic tube with pockets inclosing a series of individual inflatable bodies therein and formed with a neck on the inner periphery thereof, and a plate connected with said tube embracing said neck and provided with end flanges which rest upon the tube aside of the neck, substantially as described.

6. An elastic tube with a neck and provided with a series of inflatable bodies in its main portion having openings, and an inner peripheral metal band embracing said neck, the said inflatable bodies having openings leading through the neck and band, said parts being combined substantially as described.

WILLIAM RICHWINE.

Witnesses:
JOHN A. WIEDERSHEIM,
ARTHUR H. MACOWEN.